United States Patent [19]

Krüs

[11] Patent Number: 4,644,837
[45] Date of Patent: Feb. 24, 1987

[54] DEVICE FOR THE BURR-FREE CUTTING OF STRIP-SHAPED MATERIAL

[75] Inventor: Werner Krüs, Leverkusen, Fed. Rep. of Germany

[73] Assignee: Karl Jungel GmbH & Co. KG, Leverkusen, Fed. Rep. of Germany

[21] Appl. No.: 841,510

[22] Filed: Mar. 19, 1986

[30] Foreign Application Priority Data

Mar. 26, 1985 [DE] Fed. Rep. of Germany ....... 3510847

[51] Int. Cl.⁴ ............................................ B23D 19/04
[52] U.S. Cl. .......................................... 83/864; 83/51; 83/430
[58] Field of Search ................... 83/430, 51, 864, 434, 83/501, 500, 503

[56] References Cited

U.S. PATENT DOCUMENTS

| | | | |
|---|---|---|---|
| 1,727,796 | 9/1929 | Summer | 83/430 |
| 3,641,853 | 2/1972 | Jungbeck | 83/864 |
| 4,492,135 | 1/1985 | Ginn et al. | 83/430 X |

FOREIGN PATENT DOCUMENTS

| | | | |
|---|---|---|---|
| 55-42715 | 3/1980 | Japan | 83/864 |
| 1322151 | 7/1973 | United Kingdom | 83/864 |

*Primary Examiner*—Donald R. Schran
*Attorney, Agent, or Firm*—Sprung Horn Kramer & Woods

[57] ABSTRACT

The invention relates to a device for the burr-free cutting of strip-shaped material, especially made of metal, which has, for each cut, two pairs of circular knives on axis-parallel knife shafts. The strip-shaped material is cut into by the first pair of circular knives in the first parting step and is severed in the opposite direction by the second pair of circular knives in the second parting step. The characteristic feature of the invention is that the counter-knives of the two pairs of circular knives are arranged on a common knife shaft so as to rest against one another, and that they consist of an outer rigid, especially metallic, cutting ring and of an inner annular elastomeric hub part.

6 Claims, 3 Drawing Figures

DEVICE FOR THE BURR-FREE CUTTING OF STRIP-SHAPED MATERIAL

BACKGROUND OF THE INVENTION

1. Field of the Invention

The invention relates to a device for the burr-free cutting of strip-shaped material, especially made of metal, in two steps, which has two pairs of circular knives on axis-parallel knife shafts, each pair of circular knives consisting of a knife and a counter-knife, and by means of which the strip-shaped material is cut into by the first pair of circular knives in the first parting step and, in the second parting step, is severed in the opposite direction by the second pair of circular knives.

2. Discussion of the Prior Art

It is known to cut strip-shaped material, such as, for example, bands, sheets or the like, into individual strips by means of a pair of shears consisting of a knife and a counter-knife, that is to say a pair of knives. The knife and the counter-knife of the shears can be the knives of hydraulically or pneumatically operating shears or of eccentric shears, but also the circular knives of circular-knife or round-knife shears. Now when strip-shaped material is cut by means of such shears consisting of only a pair of knives, then, for example, a contraction occurs at the top edge of the material and burring occurs at the bottom edge. However, this burring particularly is disadvantageous to the further processing of the strip-shaped material, so that the material usually has to be retreated subsequently to remove the burr.

To avoid such a retreatment to remove the burr, which involves a high outlay in terms of the additional equipment required, German Auslegeschrift No. 1,806,305 discloses a process for burr-free cutting, in which the parting operation takes place in two steps. This is carried out by first cutting or shearing into the strip-shaped material from one side over some of the thickness of the material in the first parting step and subsequently, in the second parting step, severing it from the other side in the opposite direction until it is finally parted. As a result of this double shearing or cutting in opposite directions (counter-cut), burr-free cutting is achieved.

In the device known from German Auslegeschrift No. 1,806,305, the two parting steps consist of two pairs of circular knives, each pair with two pivot axles arranged axis-parallel, the two pairs being arranged in succession in the direction of the strip-shaped material to be severed. This known device therefore has two pairs of circular knives with a total of four axis-parallel knife shafts arranged successively in pairs. Here, the four circular knives are rigid circular discs consisting especially of a cutting steel. Burr-free cutting by means of this known device is carried out by first introducing the strip-shaped material into the first parting step with the first pair of circular knives, but only shearing into it in this step. A precondition for this is that the sum of the radii of the two circular knives of this first pair of circular knives be less than the distance between the two associated axis-parallel pivot axles or knife shafts. After it has left the first parting step, the strip-shaped material, which has only been cut into, subsequently enters the second parting step with the second pair of circular knives and is now severed completely in the opposite direction.

Although burr-free cutting of strip-shaped material is basically possible by means of this device known from German Auslegeschrift No. 1,806,305, nevertheless an essential disadvantage of this device is that the four knife shafts of the two pairs of circular knives have to be aligned exactly axis-parallel. This applies particularly to the two pairs of knife shafts arranged at a certain distance from one another in the first and second parting steps. It is necessary to align exactly axis-parallel not only the two knife shafts of the first and second parting steps relative to one another, but also the knife shafts of the first parting step relative to the two knife shafts of the second parting step. Thus, for example as a result of inaccurate alignment of the two pairs of knife shafts relative to one another, it can happen that the shearing or cutting plane defined by the second pair of circular knives (perpendicular relative to the surface of the strip-shaped material) does not coincide with the cutting plane of the first pair of circular knives. Only if this condition is satisfied, that is to say if the two cutting planes coincide, is it possible to make a burr-free right-angled cut.

Furthermore, another essential disadvantage of this known device is that the strip-shaped material has to be guided as exactly as possible between the two pairs of circular knives arranged in succession. Even when the strip-shaped material tilts only slightly between the pairs of circular knives, it can happen that the shearing or cutting plane of the second pair of circular knives is not met exactly by the strip cut into by the first pair of circular knives. It is then no longer possible to obtain a clean, burr-free and right-angled cut.

Starting from this state of the art, the object on which the invention is based is to provide a device of the type mentioned in the introduction, in which the strip-shaped material is prevented from tilting between the two pairs of circular knives and which allows burr-free right-angled cutting of the strip-shaped material.

SUMMARY OF THE INVENTION

According to the invention, this object on which the invention is based is achieved by means of a device of the type mentioned in the introduction, wherein the counter-knives of the two pairs of circular knives are arranged on a common knife shaft so as to rest against one another, and wherein they consist of an outer rigid, especially metallic, cutting ring and of an inner annular elastomeric hub part.

In comparison with the device for the burr-free cutting of flat-rolled material, known from German Auslegeschrift No. 1,806,305, the device according to the invention no longer has four, but only three knife shafts arranged axis-parallel. According to the invention, the middle knife shaft common to the two pairs of circular knives is at the same time equipped with two counter-knives knives arranged next to one another and resting against one another, with an outer rigid cutting ring and an inner annular elastomeric hub part. In contrast to this, the other two knife shafts are each equipped with a conventional circular knife which consists of a rigid circular disc preferably consisting of a cutting steel. Accordingly, the two pairs of circular knives of the device according to the invention each consist of one of these novel counter-knives on the middle of the three knife shafts and of a conventional circular knife on each of the two outer knife shafts. Since the two counter-knives are arranged on the common middle knife shaft so as to rest against one another, the shearing or cutting planes of the two pairs of circular knives of the device according to the invention coincide with one another.

The cutting process by means of the device according to the invention takes place in the following way:

If $R_{KM}$ is the radius of the circular knives on the two outer knife shafts, $R_{FM}$ is the radius of the counter-knives (that is to say, the radius of the outer rigid cutting rings of the counter-knives) on the middle knife shaft and D is the predetermined thickness of the strip-shaped material to be cut, then the distance between the axis of each of the outer knife shafts and the axis of the middle knife shaft is less than the sum of the values $R_{KM}$, $R_{FM}$ and D. Furthermore, if d is the necessary deformation in both the first and the second parting step, then the distance a between the axis of each of the two outer knife shafts and the axis of the middle knife shaft is $$a = R_{KM} + D + R_{FM} - d/2.$$

The strip-shaped material to be cut is first introduced free of tension into one of the two driven pairs of circular knives and passes through this first parting step, as a result of which the strip-shaped material is sheared into or cut into. Subsequently, the cut-into strip-shaped material runs in the opposite direction through the second, likewise driven pair of circular knives, with the result that a cut is made in the opposite direction and the strip-shaped material is severed completely. The device according to the invention is therefore a pair of shears, in which the strip inlet side and the strip out-let side are located on one and the same side of the three axis-parallel knife shafts which are preferably arranged above one another in a single stand.

The essential advantage of the device according to the invention is to be seen in the fact that the second cut is made with the greatest possible precision, since, during the process of turning by approximately 180°, the strip-shaped material cut into in the first parting step does not leave the final cutting plane of the device according to the invention. It is no longer possible for the strip-shaped material to tilt between the first and second parting steps. Consequently, the place cut into in the first parting step is met exactly in the second parting step. Furthermore, a right-angled and burr-free cut is guaranteed because, in the second parting step, the remaining fraction is preferably located in the cross-sectional centre of the strip-shaped material.

The two counter-knives of the device according to the invention preferably consist of an outer cutting ring, an inner hub ring fastened to the common knife shaft, and an annular elastomeric hub part arranged between these two rings. Whereas the hub part consists of a deformable elastic material, the cutting ring and the hub ring are rigid and themselves preferably consist of a metal, the outer cutting ring consisting especially of a cutting steel suitable for the cutting of sheet metal. This embodiment of the counter-knives according to the invention advantageously makes it possible to fasten the knives to the common knife shaft in a simple way.

According to the invention, the counter-knives, that is to say the outer cutting rings of the counter-knives, on the common middle knife shaft and also the circular knives on the two outer knife shafts have the same outside diameter. Moreover, it is advantageous to arrange the three axis-parallel knife shafts of the device according to the invention in such a way that the three knife shafts are arranged in only a single stand and lie in a common, preferably vertical plane. As regards the predetermined thickness of a strip-shaped material to be cut, these two measures make it easier to select correctly the distance between the axes of the three knife shafts of the device according to the invention which are preferably arranged above one another in the stand.

Advantageously, in the device according to the invention, two of the three knife shafts are adjustable axis-parallel relative to the third, in particular the two outer knife shafts relative to the middle knife shaft. This ensures that the thickness D of the strip-shaped material to be cut can be varied as desired. It is thus possible to carry out the burr-free cutting of strip-shaped material of differing thickness by means of the same device according to the invention.

BRIEF DESCRIPTION OF THE DRAWINGS

The drawings illustrate exemplary embodiments by means of which the invention is explained in detail.

DETAILED DESCRIPTION OF THE PREFERRED EMBODIMENTS

Figure 1:
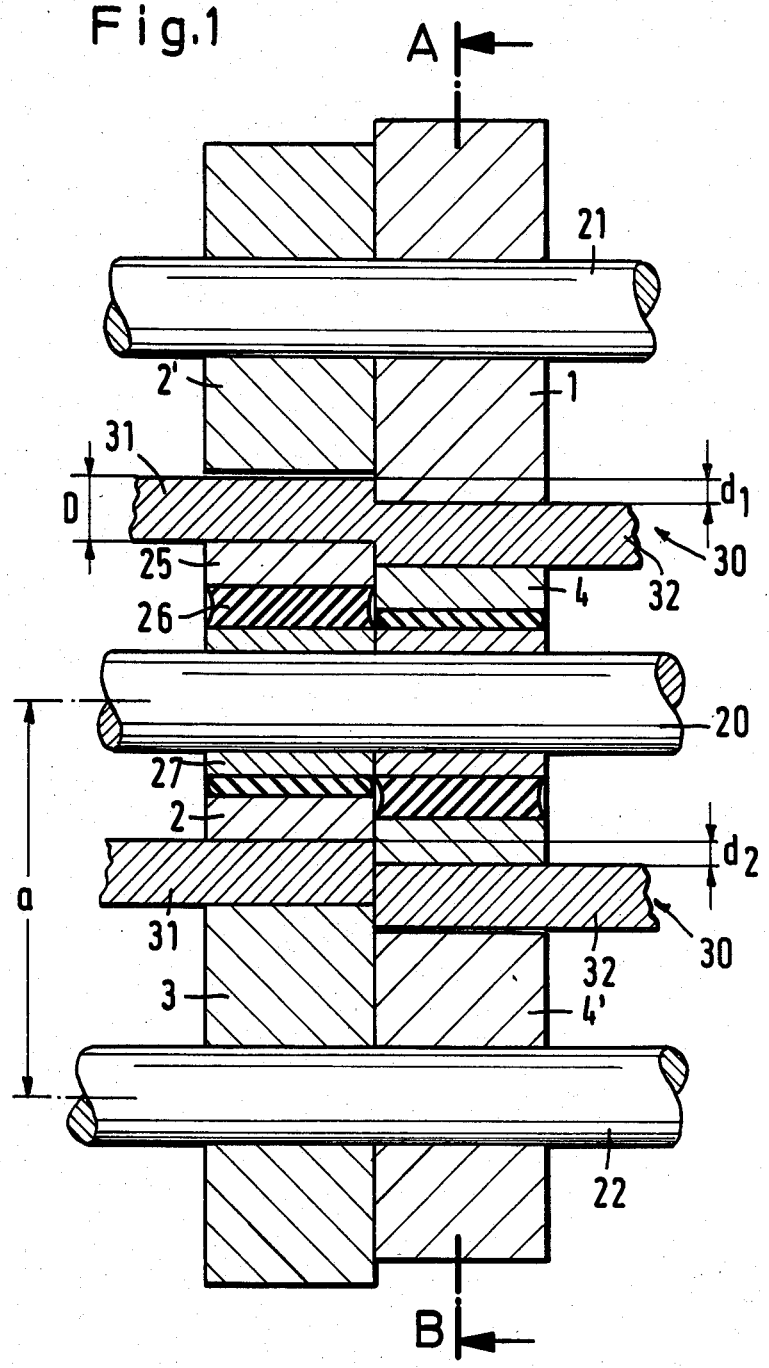
FIG. 1 shows a device according to the invention for cutting strip-shaped material into two parts, in a section through the axes of the three axis-parallel knife shafts arranged in a vertical plane.
Figure 2:
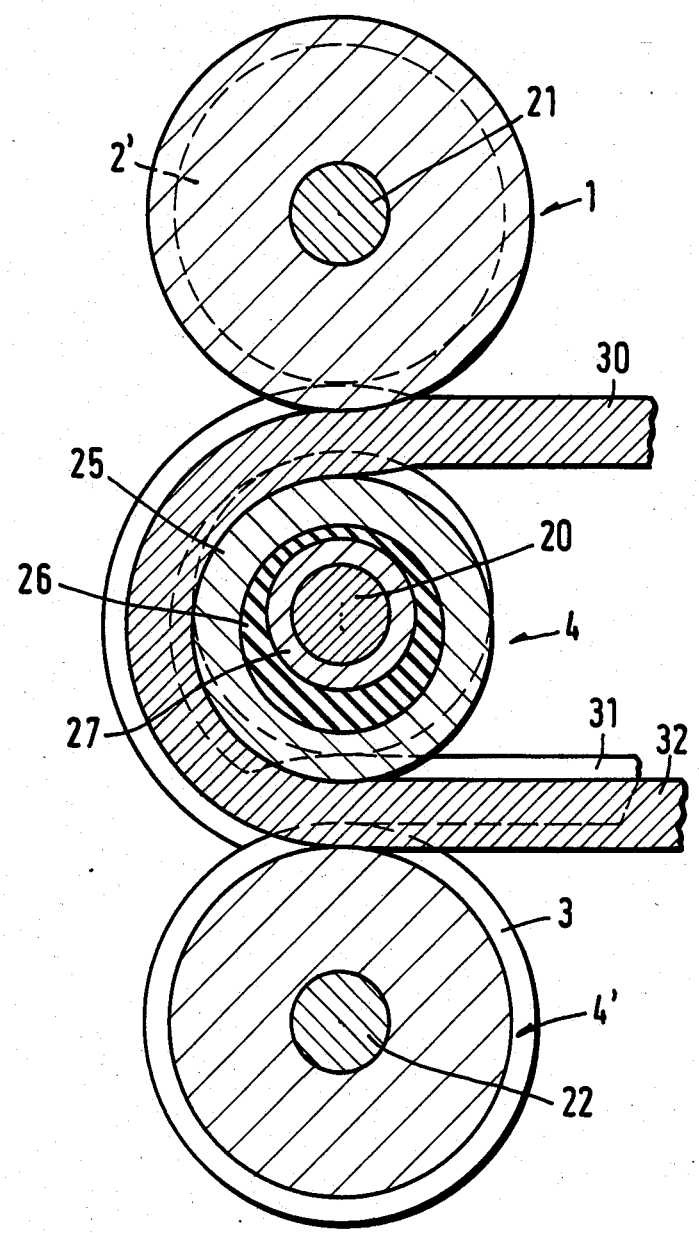
FIG. 2 is a section along the line A-B of FIG. 1.

FIGS. 1 and 2 illustrate a device according to the invention suitable for cutting strip-shaped flat material 30 into two parts or part strips 31, 32. According to FIG. 1, the three knife shafts 20, 21, 22 are arranged axis-parallel above one another and in one plane in a stand (not shown). The circular knives 1, 2, 3, 4 are pushed onto these three knife shafts and fastened to them as follows:

The two counter-knives 2 and 4 arranged next to one another are located on the middle knife shaft 20. They consist of the outer cutting ring 25, an inner steel hub ring 27 and an annular elastomeric hub part 26 located between the latter. This embodiment of the counter-knives 2, 4 is advantageous, because the inner hub ring 27 makes it easier to fasten the counter-knives 2,4 to the shaft 20. The two circular knives 1 and 3 of conventional design (homogeneous circular discs made of a cutting steel) which are assigned to the counter-knives 2 and 4 are pushed onto the two outer knife shafts 21 and 22 and fastened to these in such a way that the knives 1 and 2 form the first pair of circular knives and the knives 3 and 4 form the second pair of circular knives. At the same time, as can be seen in FIG. 1, the shearing or cutting planes of the two pairs of circular knives 1, 2 and 3, 4 coincide with one another.

If $R_{KM}$ is the radius of the circular knives 1 and 3 and $R_{FM}$ is the radius of the counter-knives 2 and 4, then the distance a between the axis of each of the two outer knife shafts 21 and 22 and the axis of the middle knife shaft 20, with a predetermined thickness D of the strip material 30 to be cut and with a predetermined necessary deformation d in the first and second parting steps, is $$a = R_{KM} + D + R_{FM} - d/2.$$

The strip material 30 to be cut is first introduced into the first parting step, that is to say into the first pair of circular knives 1, 2, and is cut into there with the deformation $d_1$. Subsequently, the cut-into material, by being turned by 180°, is pushed into the second parting step, that is to say into the pair of circular knives 3, 4. In this parting step, the strip material is then cut again with the deformation $d_2$, but in this case in the opposite direction, so that the strip material leaves the pair of circular knives 3, 4 in the form of two parts 31 and 32 separated completely from one another. $d_1 = d_2$ here.

2' and 4' denote spacing and bracing rings which are fastened on the knife shafts 21, 22 next to the knives 1, 3 and which prevent the strip material 30 from tilting during the cutting operation.

Figure 3:
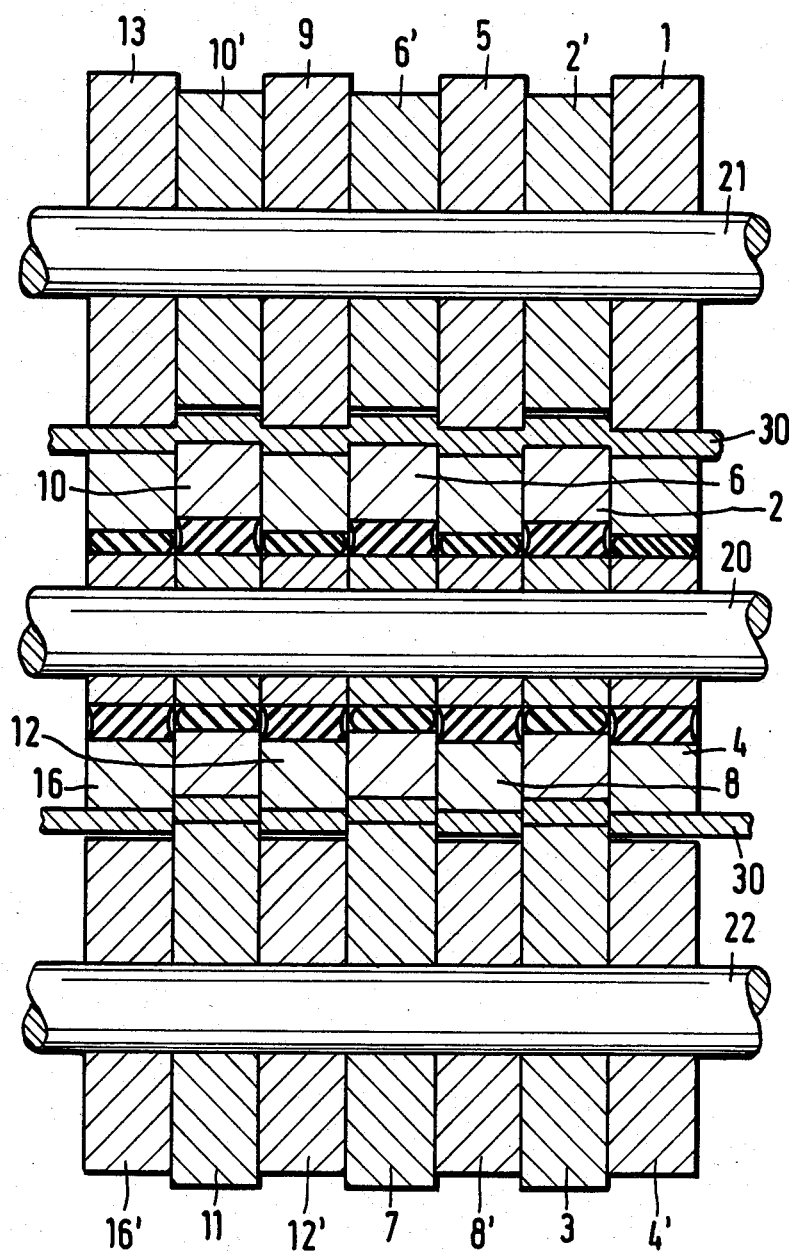
FIG. 3 shows a device according to the invention for splitting strip-shaped material into a plurality of individual strips, in a section through the axes of the three axis-parallel knife shafts arranged in one plane.

FIG. 3 illustrates a device according to the invention which is suitable for splitting strip-shaped material 30 into a plurality of individual strips. It consists of a plurality of pairs of circular knives fastened on the three knife shafts 20, 21, 22 arranged axis-parallel. Here again, the counter-knives 2, 4, 6, 8, 10, 12, 16 of each pair of circular knives are arranged next to one another on the common middle knife shaft 20. In this case, steel spacer rings 2', 4', 6', 8', 10', 12', 16' are arranged between the knives 1, 5, 9, 13 on the outer knife shaft 21 and between the knives 3, 7, 11 on the outer knife shaft 22. Whilst the width of these steel spacer rings corresponds to the width of the associated counter-knives 2, 4, 6, 8, 10, 12, 16, their radius should not be greater than the radius of the knives 1, 3, 5, 7, 9, 11, 13 minus the deformation d. On the other hand, if their radius is advantageously selected as $R_{KM} - d$, these steel spacer rings act as bracing rings which ensure that the cut-into or completely severed material remains flat over the width of these rings. At the same time, the width of the individual strips, into which the strip-shaped material is split by means of the device according to the invention, is determined by the width of the counter-knives located opposite one another and of the knives on the two outer knife shafts 21 and 22. This means that, for example, the width of the first split strip is determined by the predetermined width of the knives 1 and 4, the split width of the second strip by the predetermined width of the knives 2 and 3, the split width of the third strip by the predetermined width of the knives 5 and 8, and so on and so forth.

I claim:

1. In a device for burr-free cutting of strip material, especially of metal, in two steps, having a first and a second pair of rotating cooperating circular shearing knives on parallel axis knife shafts, each pair of circular knives comprising a cutting knife and a counter-knife, said first pair of circular knives in a first parting step cutting the strip material in one direction and, said second pair of circular knives in a second parting step, severing the strip material in the opposite direction, the improvement wherein said counter-knives of the two pairs of circular knives are arranged on a common shaft resting against one another the cutting knives of the two pairs of circular knives are arranged on separate parallel shafts, and wherein the counter-knives each comprise an outer rigid cutting ring and an inner annular elastomeric hub part.

2. The device according to claim 1, wherein said hub part is located between said cutting ring and a metal hub ring.

3. The device according to claim 1, wherein said cutting rings of the counter-knives have the same outer diameter.

4. The device according to claim 1, wherein said two pairs of circular knives have three parallel axis knife shafts which lie in the same vertical plane.

5. The device according to claim 4, wherein two outer shafts of the three knife shafts are adjustable parallel relative to the third middle knife shaft.

6. The device according to claim 1, wherein spacer rings in contact with the circular knives are arranged for guiding the strip.

* * * * *

UNITED STATES PATENT AND TRADEMARK OFFICE
CERTIFICATE OF CORRECTION

PATENT NO. : 4,644,837
DATED : February 24, 1987
INVENTOR(S) : Werner Krus

It is certified that error appears in the above-identified patent and that said Letters Patent is hereby corrected as shown below:

| | |
|---|---|
| Title Page, line under "UNITED STATES PATENT" and "Inventors" | Delete "Krüs" and substitute --Krus-- |
| Col. 2, line 56 | Delete "knives" second instance |
| Col. 6, line 9 | After "first" insert --pair-- |

Signed and Sealed this

First Day of September, 1987

Attest:

DONALD J. QUIGG

Attesting Officer

Commissioner of Patents and Trademarks